W. BROWN.
Improvement in Machines for Making Barrels.
No. 128,786. Patented July 9, 1872.

128,786

UNITED STATES PATENT OFFICE.

WILLIAM BROWN, OF ST. LOUIS, MISSOURI.

IMPROVEMENT IN MACHINES FOR MAKING BARRELS.

Specification forming part of Letters Patent No. 128,786, dated July 9, 1872.

*To all whom it may concern:*

Be it known that I, WILLIAM BROWN, of St. Louis, in the county of St. Louis and State of Missouri, have invented a new and Improved Barrel-Crozing, Chamfering, and Leveling Machine, and I do hereby declare that the following is a full, clear, and exact description thereof, which will enable others skilled in the art to make and use the same, reference being had to the accompanying drawing, forming part of this specification.

This invention relates to improvements in machines for crozing, chamfering, and leveling or trimming off the ends of the staves of a barrel; and it consists in a hollow shaft, carrying a radially-grooved disk, wherein one or more sliding-tool stocks arranged to slide radially are mounted, and another shaft working in the hollow one, and having a crank or eccentric connection with the stocks, and geared with the wheel which drives the hollow shaft, by a wheel having one tooth more or less than the wheel on the hollow shaft, so as to have a different movement or rate of speed than the disk for moving the tools out and back to the work after entering the barrel into which they are moved by a sliding table on which the shafts supporting them are mounted, all as hereinafter described.

Figure 1:
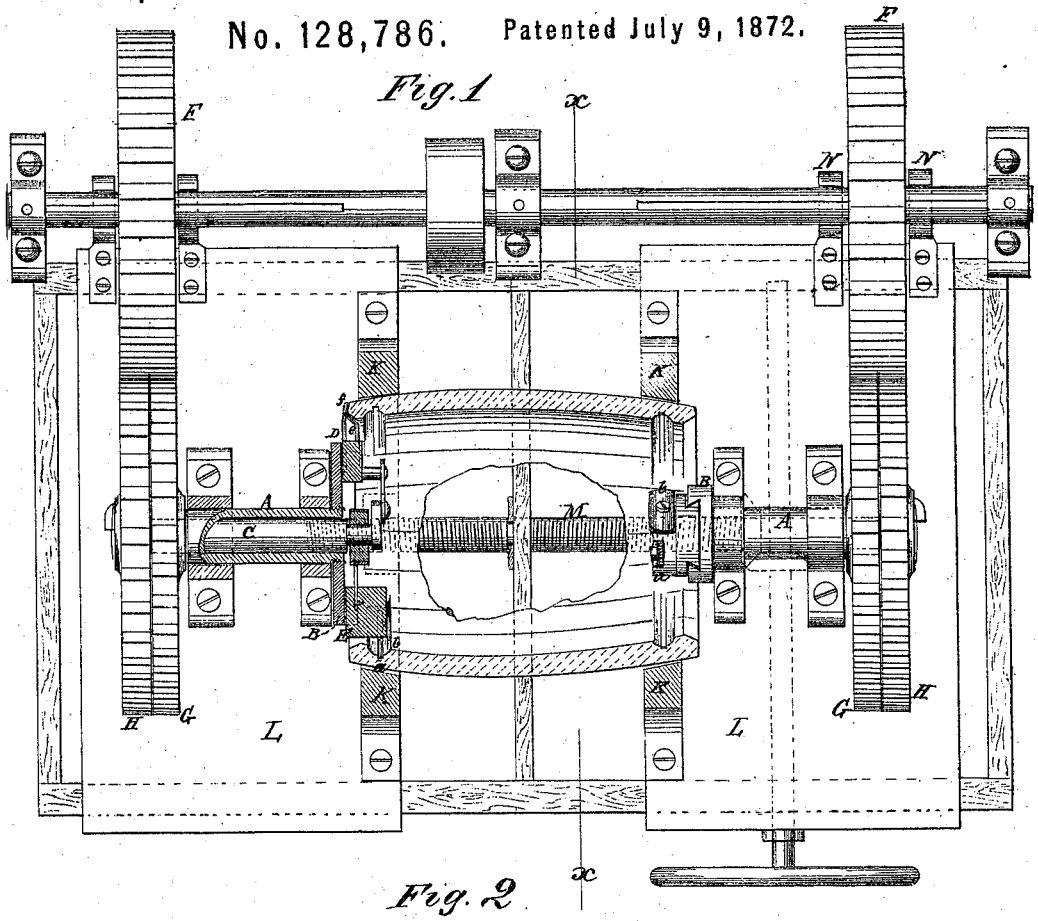
Figure 2:
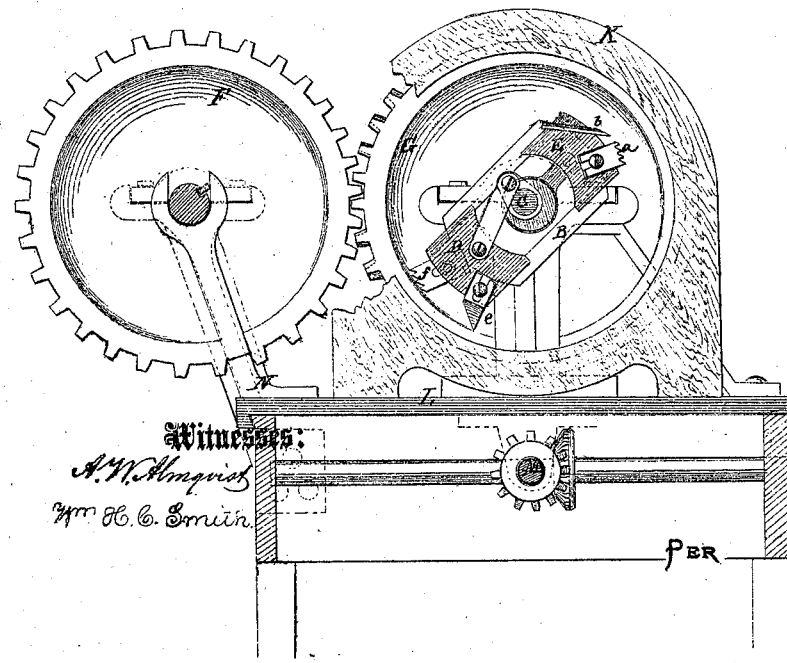

Figure 1 is partly a plan view and partly a horizontal section of a machine constructed according to my invention, the apparatus being in duplicate for operating upon both ends of the barrel at once; and Fig. 2 is a transverse sectional elevation taken on the line $x\,x$ of Fig. 1.

Similar letters of reference indicate corresponding parts.

A represents the tubular shaft; B, the grooved disk for carrying the tool-stocks; C, the shaft within the shaft A. D is one of the tool-stocks, and E another. Both these shafts are driven by one driving-wheel, F, with which each gears by a wheel of its own, G being on shaft A, and H on shaft C. One has one more or less teeth than the other so as to have a different rate of speed. The shaft C is connected to the tool-stocks by cranks or eccentrics, so as to move them out and in on the disk B while being revolved by it, as it changes in relation to shaft A. The stock E carries the crozing-tool *a* and the grooving-tool *b*, and the stock D carries the chamfering-tool *e* and the cutting-off or leveling tool *f*. The supports for the shafts A and C, also a fixed ring-holder K for holding the end of the barrel and centering it relatively to the tools, are mounted on a sliding table, L, which moves back and forth to present the tools to the barrel, and withdraw them after the work is done. It is moved by a screw, M, which moves both tables when duplicate sets of apparatus are used. Said screw is operated by a hand-wheel. The driving-wheel F is mounted on its shaft so as to slide with the table, and is moved by crotched arms N rising up from it.

The machine being adjusted so that the tool-stocks are drawn inward sufficiently to enter the end of the barrel, the latter is put in the holding-rings, and the tables are moved forward and the tool-stocks entered as much as required; the driving-wheels are then set in motion and the tool-stocks revolved, and at the same time forced outward to their work by the action of the driving-shafts A and C, working at different rates of speed.

When the work is completed the said driving-shafts are reversed and the tools moved backward, so they can be withdrawn, or the same thing can be accomplished by allowing them to continue in the forward motion until the crank-shaft C has made one more or less revolutions than the other, or thereabout, according to whether it has more or less teeth, when the said stocks will be withdrawn radially, so they may be withdrawn from the barrel.

Any other means of operating the shafts A C at different rates of speed may be employed, but the arrangement here shown is preferred as being the simplest.

Having thus described my invention, I claim as new and desire to secure by Letters Patent—

1. The combination of the tool-carrying stocks, disks, tubular shaft A, and the shaft C, when the said shafts are geared to turn in the same direction at different rates of speed, substantially as specified.

2. The combination with the said tool-stocks and shafts, arranged as described, of the barrel-holding ring K and a sliding table, L, substantially as specified.

WILLIAM BROWN.

Witnesses:
A. N. DE MERIL,
M. J. SULLIVAN.